Dec. 10, 1963  H. E. HULSEY  3,113,816
DISPENSING APPARATUS
Filed July 19, 1961
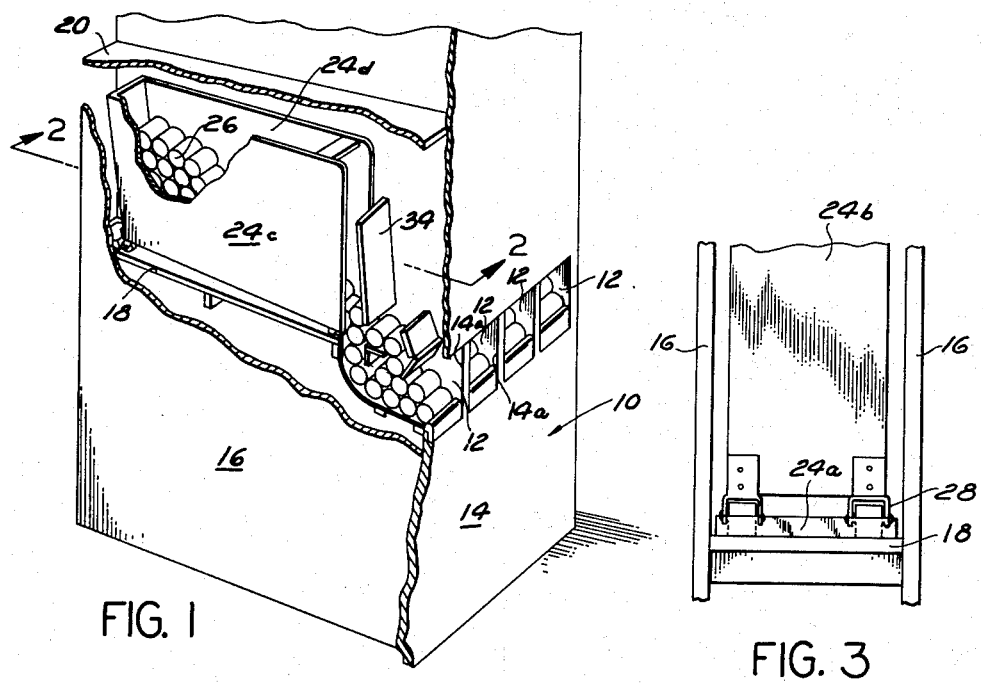
FIG. 1
FIG. 3
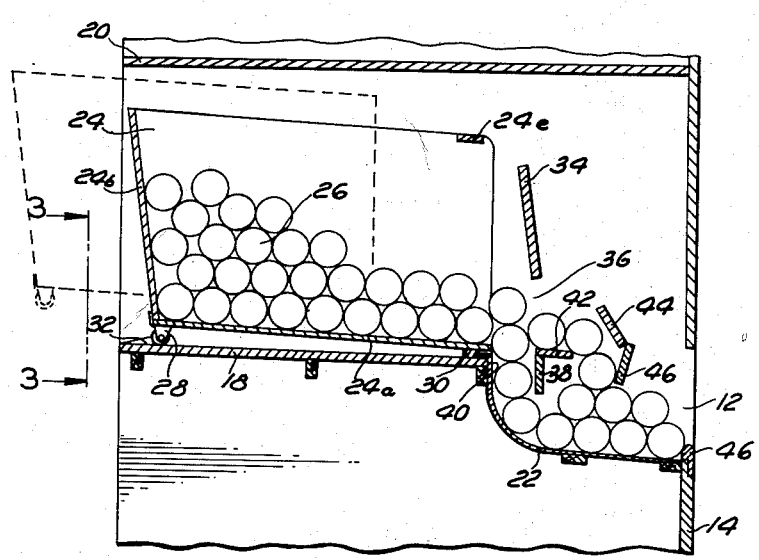
FIG. 2
INVENTOR.
HANSFORD E. HULSEY
BY FULWIDER, MATTINGLY
& HUNTLEY
ATTORNEYS

United States Patent Office 3,113,816
Patented Dec. 10, 1963

3,113,816
DISPENSING APPARATUS
Hansford E. Hulsey, 12227 Caladre, Downey, Calif.
Filed June 19, 1961, Ser. No. 117,919
5 Claims. (Cl. 312—72)

My present invention relates to dispensing apparatus, but more particularly to automatically operable devices for dispensing circular articles at a given location.

In recent years, the retail industry has undergone many important changes. For instance, much of the retail sales business is now highly automated such that the customer can select the desired goods or articles free of any interference from clerks or other personnel, the latter being available only for needed assistance and to collect the purchase price for such articles selected. Such highly automated retail outlets are frequently referred to as "supermarkets," particularly with reference to the markets which sell groceries or the like.

Supermarkets generally are arranged such that the customers are permitted to freely wander through the store and to inspect and take from the shelves any article which they desire. Thereafter, the customer and his goods pass through a check stand where an employee of the market totals the cost of the purchases and makes the proper change, as required.

Heretofore, canned goods or other articles which are packaged in circular containers have merely been placed on the shelves by the market employees or clerks, the customers then selecting the desired quantity of the desired items from the shelf. Such arrangement has required very close surveillance of the shelves to insure that the supply of canned goods thereon is replenished after a predetermined amount has been removed. Also, during such replenishing operation the employee necessarily must stand in front of the shelves thereby greatly hindering the customers making their selections. Additionally, placing a large quantity of canned goods on a shelf consumes a considerable space thereby contributing to the size and complexity of supermarkets, including the long circuitous paths and isles which the customers must follow in order to make their purchases.

In view of the foregoing it is an object of the present invention to provide apparatus for dispensing circular articles such that a substantially endless quantity of such articles is automatically fed to a given point.

Another object of this invention is to provide dispensing apparatus as characterized above which occupies a minimum amount of space.

Another object of this invention is to provide dispensing apparatus which is provided with a remotely located reservoir for retaining a large quantity of articles, and suitable passageways for feeding such articles from the reservoir to a delivery station.

Another object of this invention is to provide dispensing apparatus as characterized above which is constructed to prevent the articles from becoming jammed in the passageways leading to the delivery station.

Another object of this invention is to provide dispensing apparatus as characterized above which is so constructed that a plurality of such apparatuses can be arranged in tandem so as to greatly increase the capacity thereof.

Another object of this invention is to provide dispensing apparatus for circular articles which can be replenished without in any way interfering with a customer's selection of such goods.

Another object of this invention is to provide dispensing apparatus which can be built into the wall of a retail store such that the reservoir can be replenished on one side of the wall while the customer is free to make his selection on the other side thereof.

Another object of this invention is to provide dispensing apparatus which is simple and inexpensive to manufacture, and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

FIGURE 1 is a fragmentary perspective view of juxtaposed dispensers made in accordance with the present invention;

FIGURE 2 is a sectional view of a dispenser according to the present invention taken substantially along line 2—2 of FIGURE 1; and FIGURE 3 is an end elevational view taken substantially along line 3—3 of FIGURE 2.

Like reference numerals indicate corresponding parts throughout the several views of the drawings.

Referring to the drawings, the embodiment chosen for illustration of the present invention comprises a counter cabinet 10 for use in a supermarket or the like having a series of delivery stations 12 where a customer may select certain articles. Cabinet 10 is formed with a front wall 14 and several vertical side walls 16, the number of the latter being determined by the size of the cabinet 10 as will hereinafter become more apparent. The side walls 16 are attached in any suitable manner to the front wall 14 to provide a structure which can be supported on the floor of the market.

Extending between the side walls 16 and attached thereto in any desired manner are platforms or shelves 18 and 20. Such shelves not only tend to give the cabinet 10 the necessary rigidity but further, as will hereinafter appear in greater detail, constitute support means for certain parts of the dispensing apparatus.

Extending from the forward end of platform 18 to the front wall 14 of the cabinet is a passageway 22 which is fastened along its sides to the opposed side walls 16 of the cabinet.

The front wall 14 is provided with several openings 14a, each of which is immediately above one of the passageways 22 to thereby provide a series of delivery stations 12.

Mounted on platform 18 is a removable reservoir 24 having a bottom wall 24a, a rear wall 24b and a pair of oppositely disposed side walls 24c and 24d. These walls are firmly fastened together by any desired means in the arrangement shown in the drawings, there being a spacer 24e fastened to both of the side walls 24c and 24d to insure proper spacing thereof and to constitute handle means for removing and replacing the reservoir as will become more apparent. Spacer 24e is employed due to the fact that reservoir 24 is formed without a forward wall and an upper wall.

The reservoir 24 should be so constructed that it is merely wide enough to accept a single layer or stack 26 of canned goods or other circular articles. In this regard, it is contemplated that the subject dispensing apparatus could be employed for spherically shaped articles as well as cylindrically shaped goods as shown in the drawings. In either event, however, it is merely necessary that the articles be so positioned within the reservoir that they will tend to roll toward the forward or open end of reservoir 24.

Reservoir 24 is provided at one end with a pair of casters 28 attached to the rear end of bottom wall 24a. At the forward end thereof, is a spacer 30 which constitutes a limit stop during insertion of the reservoir 24 into the cabinet, as will hereinafter appear in greater detail, and it also acts as a shim or spacer for determining the pitch or inclination of the bottom wall 24a of reservoir 24. To prevent reservoir 24 from inadvertently rolling out of cabinet 10, there is provided a tapered stop member 32 which interferes with the rollers 28 to accomplish this result.

Connected between adjacent sidewalls 16 of cabinet 10 is a partition wall 34 immediately forward of reservoir 24 when the latter is in its operating position as shown in full lines in FIGURE 2. As will hereinafter become more readily apparent, partition wall 34 may be considered part of the reservoir 24 in that it functions as the forward end wall thereof during the dispensing operation. In this regard, partition wall 34 could be formed as part of the reservoir 24 by being firmly fastened between the side wall 24c and 24d thereof without departing from the scope and spirit of this invention.

A necessary characteristic of the present invention is that partition wall 34 must be so positioned with respect to the forward edge of bottom wall 24a of reservoir 24 that the opening 36 therebetween is sufficiently large to permit two of the circular articles to simultaneously pass therethrough. This is a necessary feature in order to ensure that several of the articles will not become jammed or wedged between such walls as they leave the reservoir.

Also connected between adjacent side walls 16 of cabinet 10 is an L-shaped partition wall 38 which has the effect of dividing the opening 36 between partition wall 34 and bottom wall 24a into a primary passageway 40 and an auxiliary passageway 42. Primary passageway 40 comprises member 22 to provide a continuous path for the circular articles from reservoir 24 to the delivery station 12.

To complete auxiliary passageway 42, there is provided a pair of partition walls 44 and 46 which are arranged between side walls 16 to direct the circular articles downwardly toward the primary passageway.

As will be readily understood by those persons skilled in the art, the aforedescribed partition walls and other structural members are merely illustrative of an embodiment of the present invention. It is realized that the various components including the partition walls could be provided with more desirable curvatures so as to better facilitate the flow of articles to the delivery station. Such changes, however, would not depart from the spirit and scope of the present invention as embraced by the appended claims.

Further, it is contemplated that the subject dispensing apparatus could be formed of substantially any materials such as plastic, steel, wood or the like.

As will hereinafter become more apparent, the circular articles are caused to flow from the reservoir 24 to the delivery station 12 due to the force of gravity, the various surfaces and passageways of the apparatus being inclined to accomplish this result. In order to prevent the circular articles from going beyond the delivery station 12, there is provided along the lower edge of each of the openings 14a of wall 14 a stop member 46.

The operation of the dispensing apparatus shown in the drawings is substantially as follows:

Reservoir 24 may be filled at any remote location merely by removing the same from within the dispensing cabinet 10. In so doing, the articles must be so arranged within reservoir 24 as to enable them to flow toward the forward end thereof under the force of gravity.

In accordance with the present invention, it should be noted that the reservoir 24 can be removed from the cabinet without in any way disturbing the customers who may be selecting articles from the delivery stations 12. In fact, it is contemplated that such operation could be performed without the knowledge of persons in front of the dispensing cabinet 10 merely by constructing the dispensers such as to constitute a wall of the building.

Under these conditions, the reservoir could be removed from the rearward side of the cabinet and filled in the storage room immediately adjacent thereto, and replaced within the cabinet without in any way disturbing the customers.

As soon as the reservoir is returned to the cabinet the articles 26 will, under the force of gravity, flow towards the opening 36 between partition wall 34 and bottom wall 24a of reservoir 24. The articles will follow successively along the primary passageway 40 toward the delivery station 12.

In the event two of the artciles arrive substantially simultaneously at the opening 36, they will be separated by the L-shaped partition wall 46 such as to cause one of the articles to follow the primary passageway 40 while the other is directed along the auxiliary passageway 42. In this manner, the simultaneous arrival at opening 36 of several articles 26 will not cause jamming.

The circular articles which follow along the auxiliary passageway 42 eventually are deposited at the delivery station 12. As the customer reaches through the opening 14a and selects one or more of the articles 26, other articles 26 will be brought by gravity to the delivery station 12.

It is contemplated within the scope of this invention that several of the aforedescribed dispensing apparatuses could be arranged in tandem such that an upper reservoir could feed into a lower reservoir, thereby greatly increasing the capacity of the apparatus. The passageways between the upper and lower reservoirs could be provided with the primary and auxiliary passageways as above described, although this would not be necessary for successful practice of the instant invention. Rather, a single passageway could be employed therebetween whereby the upper reservoir would feed the circular articles directly into the lower reservoir.

It is thus seen that the present invention provides dispensing apparatus which is so constructed as to be free of jamming. Further, the apparatus is operable to automatically supply canned goods or the like to a delivery station.

Although I have shown and described certain specific embodiments of my invention, I am fully aware that many modifications thereof are possible. The invention itself, therefore, is not to be restricted except insofar as is necessitated by the prior art and by the spirit of the appended claims.

I claim:

1. Apparatus for dispensing circular articles of substantially the same size, comprising, a storage reservoir for a multiplicity of such articles formed with an opening of such size as to pass only one of said articles at a given time, means forming a passageway for successively leading said articles from said opening to a delivery station, and means for preventing several of said articles from being jammed at said opening comprising an aperture in said reservoir and an auxiliary passageway leading therefrom to said delivery station.

2. Apparatus for dispensing circular articles according to claim 1 wherein said aperture is so arranged with respect to said opening as to receive one of said several articles at said opening to prevent said articles from being jammed thereat.

3. Apparatus for dispensing circular articles of substantially the same size, comprising, a storage reservoir for a multiplicity of such articles having an inclined bottom wall and an end wall affixed thereto to provide a lowermost corner to which said articles are forced by gravity, said bottom wall being formed with an opening in said corner of such size as to pass only one of said articles at any given time, means forming a passageway depending from the opening in said bottom wall for successively leading said articles from said opening to a delivery station, and means for preventing jamming of said articles at said opening comprising an aperture formed at said corner in said end wall and an auxiliary passageway leading from said aperture to said delivery station.

4. Apparatus for dispensing circular articles of substantially the same size, comprising, a cabinet formed with a chamber and a pair of passageways leading therefrom to a delivery station, and a reservoir for a multiplicity of such articles removably positioned within the chamber in said cabinet for cooperation with said passageway to afford uninterrupted flow of said articles to said delivery station.

5. Apparatus for dispensing circular articles according to claim 4 wherein said reservoir is provided with at least two rollers for positioning and removing said reservoir within said chamber.

References Cited in the file of this patent
UNITED STATES PATENTS

| | | |
|---|---|---|
| 1,341,893 | Fitzgerald | June 1, 1920 |
| 1,345,864 | Lethern | July 6, 1920 |